United States Patent Office 3,180,298
Patented Apr. 27, 1965

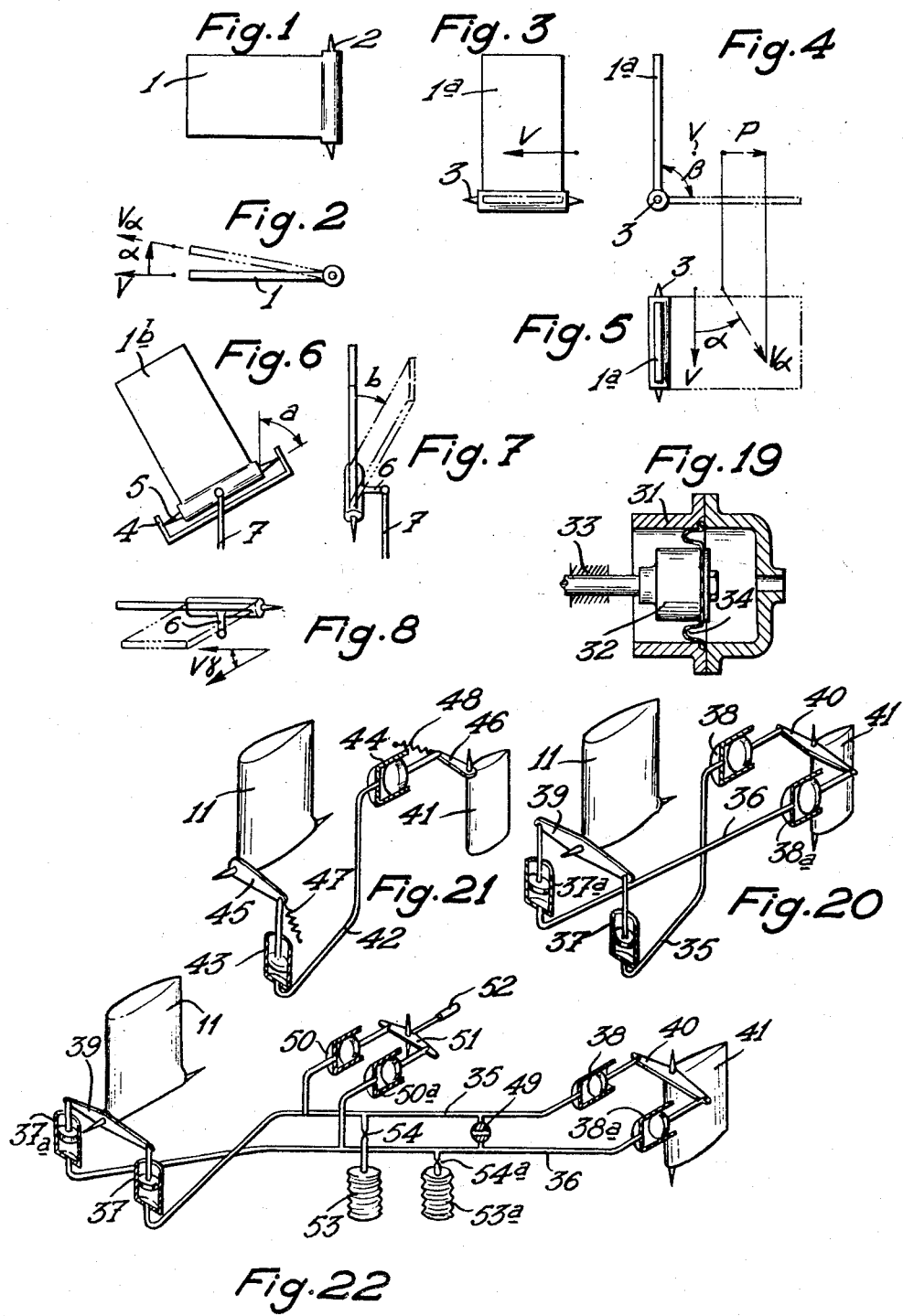

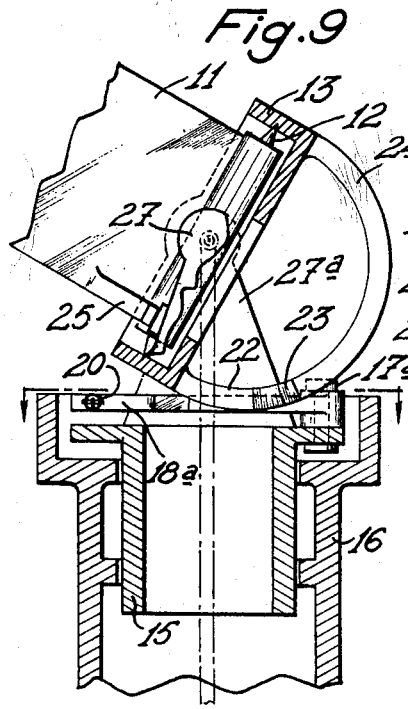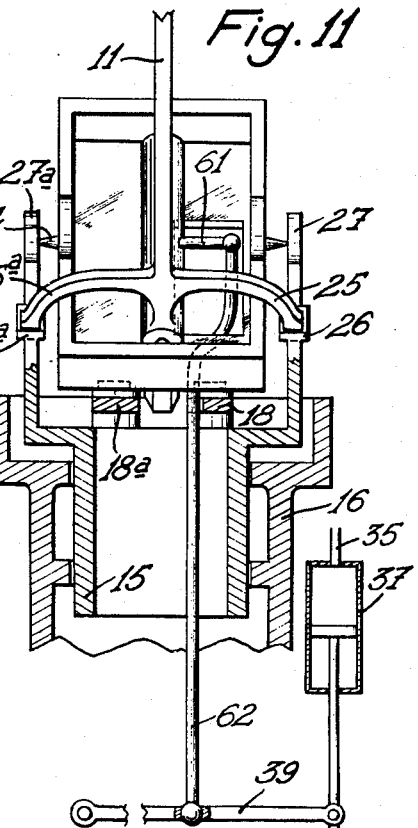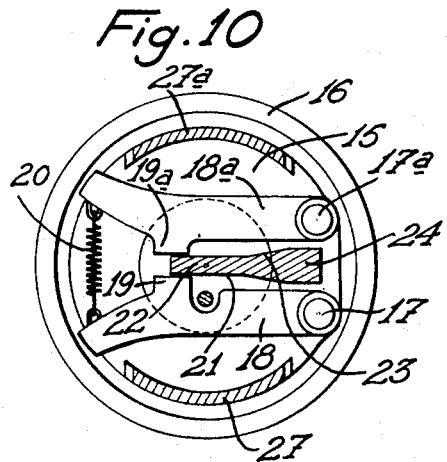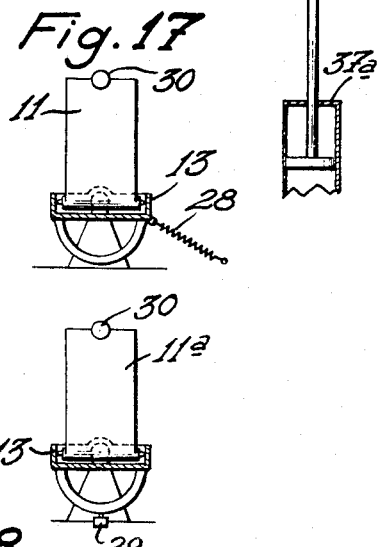

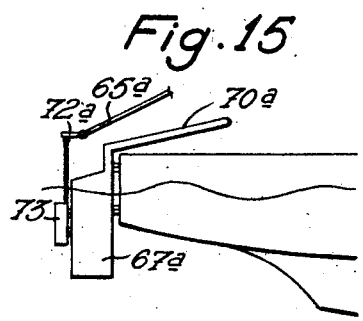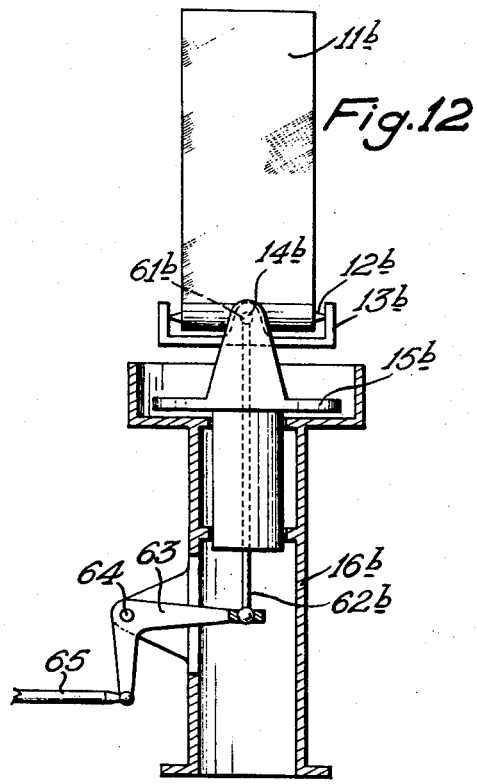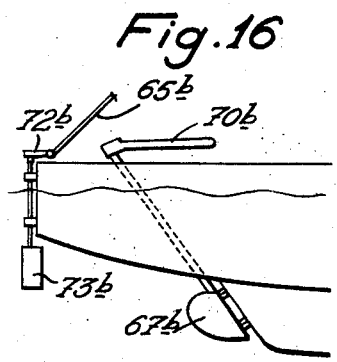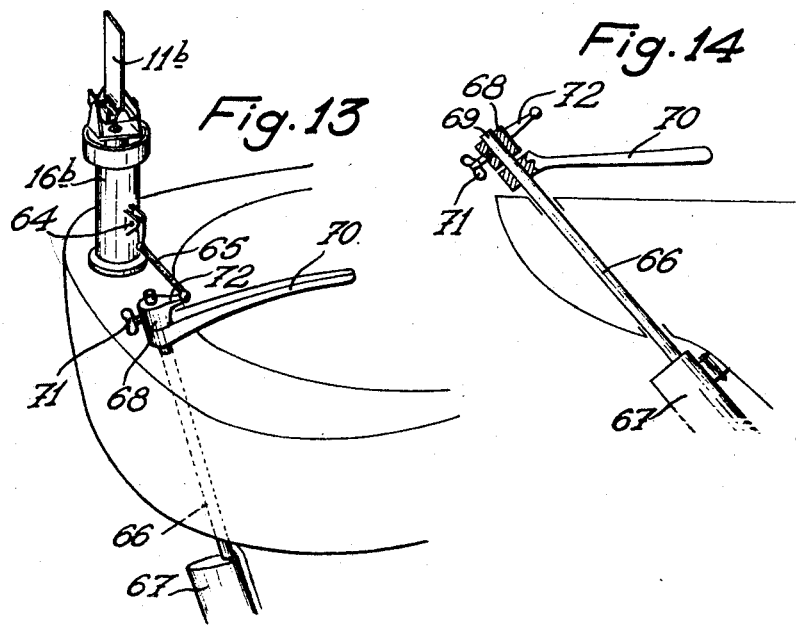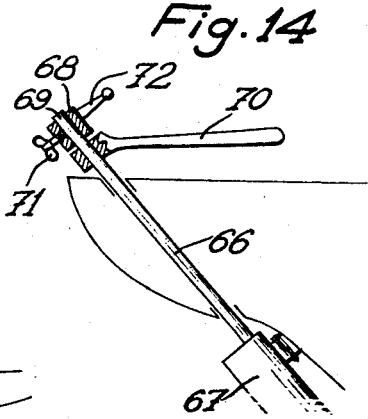

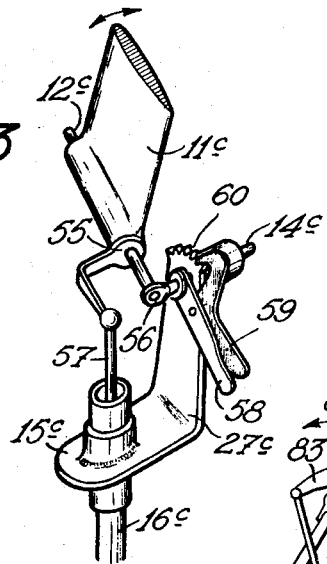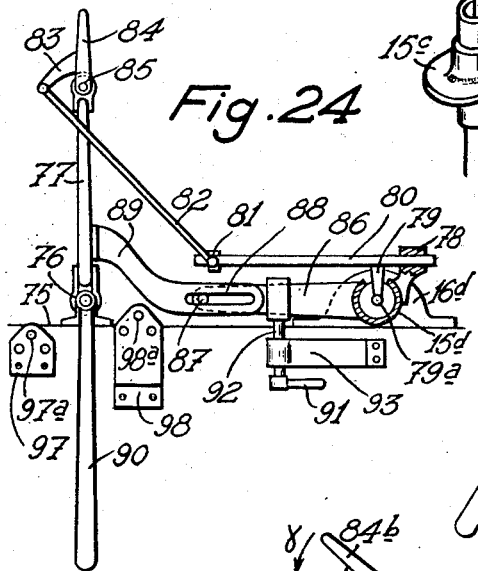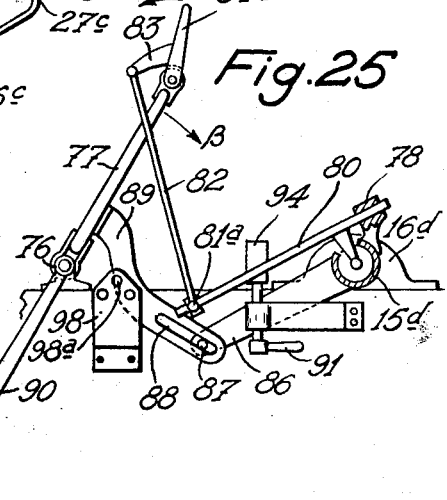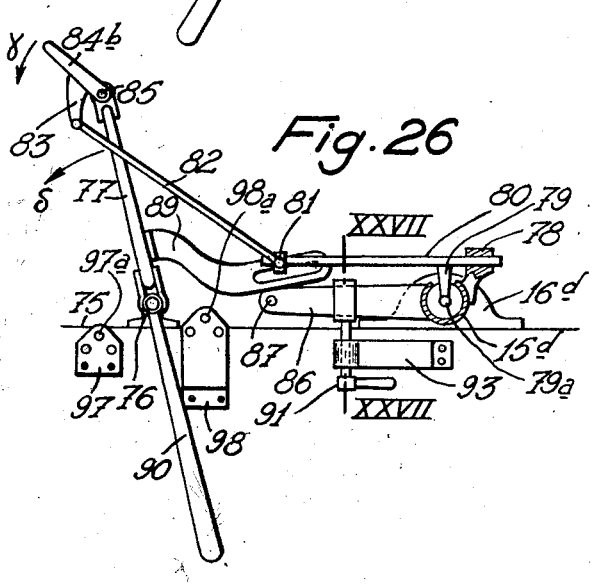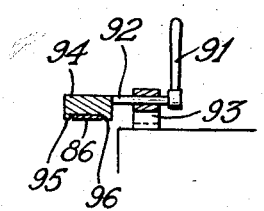

3,180,298
SAILING TRIM REGULATOR FOR SAILING-BOATS
Marcel Louis Gianoli, Neuilly-sur-Seine, France, assignor to Mecanique Navale et Outillage de Precision M.N.O.P., Asnieres, Seine, France
Filed Dec. 31, 1962, Ser. No. 248,635
Claims priority, application France, Jan. 5, 1962, 883,925, Patent 1,317,974; Jan. 15, 1962, 884,826, Patent 80,926; Dec. 11, 1962, 918,218, Patent 82,819
25 Claims. (Cl. 114—39)

With a view to restoring a sailing-boat to its initial orientation relative to the wind, namely to its original sailing trim, after a change in direction, recourse has been had to a wind vane mounted on the sailing-boat to indicate the direction of the relative wind, said vane operating the rudder member, the rudder itself, or an auxiliary control surface (hereinafter referred to as a tab) hinged to the rear of the rudder. Conventional wind vanes are hinged about a vertical axis and, in response to the action of the relative wind, sustain angular deflections equal to the wind veerings, for instance 1° for 1°, assuming freedom from mechanical resistance. Since the degree of travel of the rudder control must be adjusted as a function of the wind strength, in such manner as to obtain large deflections when the wind is light and small deflections when the wind is strong, layouts utilizing conventional wind vanes, which produce only a relatively small amount of work available on the wind vane shaft, make it necessary to use complex mechanical devices to ensure that this requirement is met.

Now, when assuming on the contrary that the wind vane is hinged about a horizontal axis parallel to the mean direction of the wind, it would be found that when the wind veers through 1° the vane is tilted sideways, assuming it is balanced, in response to a thrust which cancels out not for a 1° deflection but for a 90° deflection, namely when the vane is fully feathered as it moves into the horizontal position. The work available on the vane shaft is then multiplied in the ratio of 90:1.

This invention accordingly has for its object to provide a sailing trim regulator for sailing-boats, comprising a wind vane connected to the rudder or the rudder tab and mounted rotatably in a cradle which pivots about a vertical axis and is adjustable in inclination between positions wherein the vane hinge axis is respectively vertical and horizontal, means being provided, firstly, to lock the vane on the cradle and leave the latter free to pivot, in which case the unit acts as a weathercock and, secondly, to arrest pivotal motion of the cradle and free the vane thereon in order to provide automatic steering.

In this way, there is successively obtained automatic adjustment of the cradle into the mean wind direction and positioning of the vane in the lee of the mean wind for automatic steering.

The cradle inclination can be adjusted manually, or else automatically under the action of the wind force.

The link-up between the vane and the rudder or rudder tab is achieved by means of a mechanical transmission, or preferably a leakless low-friction hydraulic transmission, which may be either of the duplex type with two pairs of transmitting and receiving cylinders, or of the single type with one transmitting and one receiving cylinder which may include return springs.

The description which follows with reference to the accompanying drawings, filed by way of example only and not of limitation, will give a clear understanding of how the invention can be carried into effect and will disclose still further particularities thereof.

In the drawings:

FIGURES 1 and 2 are schematic illustrations, in side elevation and plan view respectively, of a conventional vertically hinged wind vane.

FIGURES 3 through 5 are schematic illustrations in side elevation, front elevation and plan view respectively, of a horizontally hinged wind vane.

FIGURES 6 through 8 are views similar to those of FIGURES 3 through 5, of a wind vane hinged about an oblique axis.

FIGURE 9 is a partial diametrical section view in elevation, with cutaway, of a sailing trim regulator for sailing-boats, executed in accordance with the invention, the regulator being in the weathercock configuration.

FIGURE 10 is a sectional view taken through the line X—X in FIG. 9.

FIGURE 11 is a partial section of the device of FIGURE 9, taken through a plane perpendicular to that of FIGURE 9, the sailing trim regulator being hydraulically connected to the rudder member.

FIGURE 12 is a schematic diametrical section in elevation, similar to FIGURE 9, the unit being in the automatic steering configuration with a mechanical link-up to the rudder member.

FIGURE 13 is a perspective view of the sailing trim regulator mechanically coupled to a sailing-boat rudder.

FIGURE 14 is a section taken through the rudder mainpiece of FIGURE 13.

FIGURES 15 and 16 are schematic illustrations of the mechanical linkage between a sailing trim regulator and a tab, respectively mounted on the rudder and independently thereof.

FIGURES 17 and 18 are schematic illustrations of two automatic-inclination modes of the vane-supporting cradle in response to the effect of the wind force.

FIGURE 19 shows an embodiment of a hydraulic transmission cylinder.

FIGURES 20 through 22 show three methods of hydraulically linking the vane element of a wind vane to a rudder tab.

FIGURE 23 is a perspective view of a device for manually controlling the cradle tilt in a sailing trim regulator executed in accordance with this invention.

FIGURE 24 is a view from above of a device for slaving the after-piece and auxiliary tab of a sailing-boat to a sailing trim regulator executed according to this invention.

FIGURES 25 and 26 respectively illustrate the positions occupied by the device of FIGURE 24, on the one hand, when the sailing trim regulator vane operates as a weathercock and, on the other hand, when said vane operates for automatic steering of the sailing-boat.

FIGURE 27 is a section taken through the line XXVII—XXVII of FIGURE 26.

Reference is first had to FIGURES 1 and 2, wherein the conventional embodiment shown thereon comprises a weathercock 1 pivotally mounted about a vertical shaft 2. If the relative wind originally blows in the direction of the arrow V parallel to vane 1 and subsequently veers through an angle $\alpha$ and blows in the direction of arrow $V_a$, then the vane 1 will assume the position shown in broken lines on FIGURE 2 after sustaining an angular deflection equal to $\alpha$, that is to say that to each degree through which the relative wind veers, there corresponds 1° of deflection of the wind vane.

It it be now assumed that the weathercock vane 1a is hinged about a horizontal axis 3 parallel to the mean wind direction V, as shown in FIGURES 3 to 5, it will be seen that when the wind veers into the direction $V_a$, say through an angle of 1°, this deflection generates a thrust P on the vane which is equal to the projection of the vector $V_a$ onto a plane perpendicular to axis 3, which thrust inclines said vane laterally until its action is cancelled out, i.e. until the vane has rotated through an angle $\beta$ equal to 90° and flattened out into a horizontal position. The work available on the shaft 3 of the weathercock vane 1a is thus multiplied ninety times in relation to the work available on the shaft 2 of the weathercock vane 1.

With a view to allowing for adjustment of the trim of a sailing-boat, as shown in FIGURES 6 through 8, the cradle 4 within which the vane 1b is rotatably mounted about shaft 5 is adjustably inclinable between the vertical, the weathercock then operating conventionally, and the horizontal, in which position its power is amplified. Assuming the vane to be parallel to the mean wind direction V, any change in inclination $\gamma$ of the relative wind to $V_\gamma$ will result in a vane inclination $b$ dependent upon the initial cradle tilt $a$ relative to the vertical. The angles $\gamma$, $a$ and $b$ are correlated by the relation:

$$\tan b = \frac{\tan \gamma}{\cos a}$$

which shows that when $a$ is equal to 90°, any deviation $\gamma$ of the relative wind with respect to the mean wind will cause the vane to sustain a full deflection through 90°.

Furthermore, if movement of the weathercock vane is transmitted to the rudder tab through a lever 6 which is rigid with the vane hinge shaft and connected to a vertical rod 7, then a given vane deflection $b$ will result in rod travel that will be all the greater as the cradle tilt angle $a$ is larger. This travel will be proportional to the relation $$\frac{\sin a}{\sqrt{1+\frac{\cos^2 a}{\tan^2 \gamma}}}$$

which relation shows that said travel will be null for $a=0°$ and maximum for $a=90°$.

The special coupling arrangement thus heightens the adjustment effect on the action of the weathercock vane, by tilting the cradle thereof.

Such a vane associated to a tilting cradle can be used with advantage to obtain automatic steering. In this connection, it should first be noted that such automatic steering is of little benefit for tilt angles included between zero and 30° relative to the vertical, as the preceding relations clearly indicate. Within this zone, the inclinable cradle-type vane can be used as an ordinary weathercock. For automatic steering, on the other hand, such a tilting cradle-type vane must fulfil two requirements: firstly, the vertically disposed vane must be in the lee of the mean wind, with the cradle consequently itself oriented in this mean direction; secondly, the assembly must permit automatic adjustment of the cradle into the mean wind direction, thereby facilitating fulfilment of the preceding requirement.

To secure these results, the cradle must be free to direct itself about a vertical axis when its angle of tilt relative to the vertical is null, the vane being then locked in the zero position on the cradle, after which, as soon as the cradle has been tilted to an angle outside the zone defined hereinbefore, it must be possible to lock its rotation in the vertical plane at the same time as the vane is released once more.

FIGURES 9 through 11 illustrate an embodiment of a sailing trim regulator for sailing-boats, which fulfils these requirements. As can be clearly seen from the figures, the vane 11 rotates about a shaft 12 in a cradle 13, which in turn rotates about a horizontal shaft 14, perpendicular to shaft 12, upon a vertical mount 15 pivotally supported on a vertical shaft mounted on a base 16 fixed to the sailing-boat. Hinged onto the mount 15, at 17 and 17a, are two jaws 18 and 18a which are spring-loaded by a spring 20, are arranged symmetrically in relation to a vertical diametrical plane of said mount, and are provided with two facing projections 19 and 19a. Beneath the cradle 13 is disposed a cam 21 embodying a circular portion centered upon the shaft 14 and an area 22 of small thickness which is joined via shoulders 23 to an area 24 of large thickness, said cam being movable between jaws 18 and 18a with its area 24 positioned adjacent to the jaw hinge points 17 and 17a. Vane 11 is provided with two arms 25 and 25a adapted to contact stops 26 and 26a on the mount arms 27 and 27a between which the cradle is pivoted.

In the position shown in the figures, wherein the vane hinge shaft 12 is relatively little inclined to the vertical, the vane arms 25 and 25a butt against the stops 26 and 26a and thereby lock the vane with respect to the cradle, which cradle is in turn free to pivot about a vertical axis by reason of the fact that the mount 15 is free to pivot within the base 16. If the tilt angle of cradle 13 be modified so as to restore the vane hinge shaft 12 to the horizontal, then when the shoulders 23 of cam 21 encounter the projections 19 and 19a, the cam portion 24 will spread the jaws 18 and 18a, which will then jam against the inner surface of mount 16, thereby locking pivotal motion of the cradle about the vertical shaft. At the same time, vane 11 is released within its cradle and can assume such inclinations as result from changes in the direction of the relative wind.

In the former case, the system operates as a weathercock, whereas in the latter case it can provide automatic steering.

The cradle can be tilted manually to suit the wind force. Thus, as is clearly shown in FIGURE 23, in which like components with reference to FIGURES 9 through 11 bear like reference numerals followed by the letter $c$, the cradle consists of a cranked lever 55 and a journal bearing 56 rigid with the hinge shaft 14c, the mount 15c rotating on the tubular base 16c through which extends the rod 57 forming part of the transmission connecting the sailing trim regulator to the rudder member. A lever 58 rigid with journal bearing 56 allows for tilting the cradle about shaft 14c, and can be locked in the desired position by means of a pawl 59 which is pivotally mounted on it and adapted to engage with the teeth of a toothed sector 60 embodied on the arm 27c of mount 15c.

Alternatively, the cradle can be caused to tilt automatically in response to the wind force, by utilizing either of the two arrangements illustrated schematically in FIGURES 17 and 18.

Referring first to FIGURE 17, the cradle 13 within which vane 11 is pivotally mounted is statically balanced about its tilt axis and spring-loaded by a spring 28 which is fixed to the mount in the position wherein the vane hinge axis is at right angles to the vertical. In the embodiment shown in FIGURE 18, the cradle 13 is overbalanced by a counterweight 29 in such manner that the center of gravity of the vane-cradle-counterweight assembly be located beneath the cradle tilt axis. The vane 11 or 11a is additionally provided at its extremity with a spherical or cylindrical shaped protrusion 30 which offers resistance to the wind, so that the latter tends to tilt the vane and the cradle 13 through angles relative to the vertical which are all the smaller as the wind is stronger. The design is such that for the minimum anticipated wind force the spring 28 or counterweight 29 provides a 90° tilt angle relative to the vertical. In cases where the wind is too strong to permit automatic steering, the cradle is tilted into the aforementioned zone adjacent to the null angle of tilt, in which zone the cradle mount becomes free to pivot vertically and the vane is locked on and moves in unity with the cradle, the assembly thus behaving as an ordinary weathercock.

With the sailing trim regulator positioned at a convenient point on the sailing boat, preferably in proximity to the name-board of said sailing-boat or to the trailing edge of the keel beneath the hull, the connection to the rudder member (consisting of the rudder itself or a tab hinged aft thereof, either on the rudder or independently of same) can be accomplished by means of a mechanical transmission of the type illustrated in FIGURES 12 through 14.

In the specific embodiment shown in FIGURE 12, wherein the schematically illustrated components which are similar to those of FIGURE 9 bear like reference numerals followed by the letter *b*, the components used for locking the vane in the weathercock configuration and for locking the cradle in the automatic steering configuration are not shown in the interests of simplification.

On its base, vane 11*b* supports at its foot a lever 61*b* which is perpendicular to it and to one of the ends of which is pivotally connected a rod 62*b*, which rod has its other end coupled in driving relation to a crank-arm 63 which is hinged at 64 onto the support 16*b* and controls a rod 65 which actuates the main-piece 66 of the rudder 67, which is the after-piece of the main rudder. Rod 65 is connected to main-piece 66 through a clutch system which can be fitted, for instance, at the main-piece actuation point.

In the embodiment shown in FIGURES 13 and 14, said clutch means consists of a sleeve 68 rotatably mounted on an extension 69 of main-piece 66, beyond tiller 70, and provided with a screw 71 for rigidly connecting it to, or releasing it from, said extension 69. Sleeve 68 is provided with a lever 72 to which rod 65 is ball-jointed.

The wind vane consisting of the vane proper and its fittings is first adjusted for operation as a weathercock so that it can place itself in the lee of the wind. Subsequently, after it has been set in the steering configuration wherein vane 11*b* is free whereas cradle 13*b* is prevented from rotating vertically, said vane actuates the rudder steering system.

Instead of leading up to the rudder after-piece 67, as shown in FIGURES 13 and 14, the mechanical transmission hereinbefore described could alternatively lead up to an auxiliary rudder or tab of smaller size than the rudder but adequate to effect course corrections, as is clearly shown in FIGURE 15, wherein the tab 73 is directly pivotally secured on the rear of the main rudder 67 controlled by tiller 70*a*, or, as is illustrated in FIGURE 16, wherein said tab 73*b* is mounted independently and aft of the rudder 67*b* controlled by tiller 70*b*. In these figures, like components to those in FIGURES 13 and 14 bear like reference numerals followed by the letters *a* and *b* respectively.

In the case of the embodiment illustrated in FIGURE 15, the piloting may be performed through two different manners. Either the tiller may be locked and the tab 73 acts in the same direction as a conventional rudder or said tiller is free. In said last event, the tab 73 when turning generates as known an effort which turns the rudder in a reverse direction. The control of the tab must be reversed for passing from the one to the other configuration.

The link-up between the rudder member and the sailing trim regulator is particularly easy to provide, irrespective of its path, if recourse be had to a hydraulic transmission system with a pressure-emitting piston connected to the vane and a pressure-receiving piston connected to the rudder member. Such a transmission must embody little friction and be free from leaks. This can easily be achieved, as shown in FIGURE 19, by using as the transmitting or receiving cylinder a cavity 31 in which a piston 32 guided through 33 provides a large clearance obturated by a flexible diaphragm 34 made of rubbered fabric, say, which is pinched between the piston and the cylinder and affixed thereto. In operation, the diaphragm folds or unfolds according to the direction of piston travel.

The link between the vane and the auxiliary tab can be provided by two hydraulic lines 35 and 36 connecting two transmitting cylinders 37 and 37*a* to two receiving cylinders 38 and 38*a* coupled through beam-levers 39 and 40 to vane 11, by means of a rod 62 and a lever 61 at right angles to said vane (FIG. 11), and tab 41 (see FIGURES 11 and 20), or alternatively by a single line 42 interconnecting a transmitting cylinder 43 and a receiving cylinder 44, which are respectively coupled to the vane and the tab through levers 45 and 46 and optional return-springs 47 and 48 attached to the sailing boat and which are designed to maintain the hydraulic circuit under pressure in cases where the forces to be overcome produce a sufficient underpressure for gas bubbles to find their way into the circuits (see FIGURE 21). Beam-levers 39, 40 and levers 45, 46 are respectively rigid with the hinge shaft of the vane and with the main-piece of the rudder member.

FIGURE 22 illustrates the case of a two-line transmission and shows that other components can be connected into the hydraulic transmission system to fulfil certain auxiliary functions. Thus a by-pass cock 49 can be interposed between lines 35 and 36. When left open with the weathercock latched in the zero position, said cock allows auxiliary tab 41 to assume the balanced position to permit rudder operation by the helmsman. When the weathercock becomes operative to provide automatic steering, this cock is shut off once more.

It is furthermore possible to provide a second emitter unit comprising two cylinders 50 and 50*a* connected to lines 35 and 36 and linked to a beam-lever 51 operated by a lever 52 at the navigator's disposal. When the weathercock is latched in the zero position and no longer emits commands, the auxiliary tab 41 can be trimmed manually. This arrangement offers the advantage of effortless steering for the helmsman.

Lastly, it is possible to connect, to one or both of the hydraulic circuits, a corrector device to provide a phase lead to the motions of the auxiliary tab and thereby allow for more energetic steering without fear of rocking the boat, even at high sailing speeds.

As is shown in FIGURE 22, each of said devices consists of an elastic capacity 53 or 53*a* formed, for instance, of a metal bellows connected to line 35 or 36 via a small-section diaphragm 54 or 54*a*. When vane 11 produces a transfer of pressurized liquid through the lines, tab 41 follows up instantly; this is conversely not the case for bellows 53 and 53*a*, into which the delivery of liquid is slowed by diaphragms 54 and 54*a*. When the bellows have subsequently changed their shape and absorbed part of the displaced liquid, thereby resulting in a return of the tab to its normal operating position, either through a sudden movement of the helmsman or through a slow oscillation of the whole, a phase lead is obtained since the steady state of the tab that results from such absorption is always preceded by a larger tab deflection, which, as is well known, prevents incipient rolling of the boat. In sustained oscillation, for instance when the weathercock returns toward its zero position, the bellows is still in a state of excess volume due to the previously created overpressure, so that tab 41 reverts to zero before the weathercock.

By use of the sailing trim regulator according to this invention, it is possible to substantially reduce the force customarily exerted on the tiller of the main rudder, thereby making it possible to reduce the length of said tiller, reduction which is considered as highly desirable by most helmsmen.

Accordingly, recourse is had to the layout shown in FIGURES 24 through 26, wherein the boat's name-board 75 has affixed thereto the pivots 76 of after-piece 77 and also the base 16*d* into which is journaled the sailing-trim regulator mount 15*d*.

Said mount is provided at its foot with a counter-lever 79 similar to lever 63 of FIG. 12, receiving at 79*a* the rod 62*b* which is actuated above by the vane of the sailing-trim regulator. Said lever 79 is rigid with a shaft 80 pivotally mounted in a bearing 78 and supporting at 81 a vertical lever which operates a rod 82 pivotally connected to an arm 83 rigid with the auxiliary tab 84 which is hinged at 85 onto the after-piece 77. Onto mount 15*d* is fixed a flexible arm 86 carrying a peg 87 which engages in a slot 88 embodied in a lever 89 fixed to after-piece 77.

This configuration corresponds to the second case disclosed with respect to FIG. 15, i.e. to the case where the free tiller 90 turns in a direction reverse to the turning direction of tab 84. In said event the sailing trim regulator vane being in the weathercock position wherein the rod which actuates lever 79 is immovable, and hence also the lever 89, any movement of tiller 90 coupled to after-piece 77 will cause mount 15d to be so rotated by peg 87 that lever 81 assumes position 81a shown in FIGURE 25. Movement of said lever from position 81 to position 81a results in tab 84 being deflected relative to the after-piece in the direction α and occupying position 84a on FIGURE 25, said deflection taking place reversely with respect to that β of said after-piece, i.e. in that direction for which the force to be normally exerted on the tiller is reduced, thereby allowing for a reduction in the length of tiller 90 and, with it, a reduction of the space required on the boat for tiller displacement. The tab thus acts as a servo-controlling surface.

The device hereinbefore described with reference to FIGURE 24 can be used to slave the after-piece to the sailing trim regulator when same operates in the automatic steering mode. Accordingly, a lever 91 is attached to a horizontal shaft 92 journaled in a bearing 93 affixed to the sailing-boat, said lever being rigidly connected to an eccentric shoe 94 provided with two boundary flanges 95 and 96, the distance between which is slightly greater than the depth of flexible arm 86 (see FIGURE 27).

If said eccentric shoe 94 be pressed against flexible arm 86, which is designed to engage between flanges 95 and 96, then peg 87 will be released from slot 88, thereby making tiller 90 independent of said arm 86. Mount 15d will then remain motionless, together with shaft 80. Any subsequent deflection of the after-piece 77 in the direction δ in response to tiller 90, as shown in FIGURE 26, will then be arrested by the deflection of the tab occupying position 84b in the direction γ similar to δ, the tiller as well as the after-piece being substantially locked at a determined angle by this hydrodynamic link. Said hydrodynamic lock differs from a mechanical lock of the after-piece which may be broken up during a heavy sea, such a hydrodynamic lock yields under the action of a wave but is immediately restored to its normal position.

Conversely, if freedom be then imparted to the sailing trim regulator vane, the hinge axis of which is located outside the vane-to-cradle latching zone, said vane will actuate lever 79 through 79a, thereby causing shaft 80 to be rotated in bearing 78 and lever 81 to oscillate about the axis of said shaft. Any angular shift of lever 81 operates the after-piece by a follow-up process, in a manner well known per se, thereby achieving automatic steering of the sailing-boat.

The utilizations of tab 84 as a servo-controlling surface and as a locking means for the tiller 90 may be performed independently from any connection with the sailing trim regulator. In that case rod 82 is disconnected from lever 81 and pivotally connected either to a support 97 secured on the sailing-boat on the same side with respect to the after-piece as the arm 83 of tab 84, whereby said tab acts as a servo-controlling surface, or to a support 98 secured on the sailing-boat on the side of said after-piece 77 which is opposite said arm 83 in order to obtain the hydrodynamic locking of the tiller 90 and after-piece 77. Supports 97 and 98 are respectively provided with a multiplicity of holes 97a and 98a for the pivotal mounting of rod 82 with a view to respectively modify the servo-controlling action of tab 84 and the position for which the after-piece 77 is hydrodynamically locked.

What I claim is:

1. A sailing trim regulator for a sailing-boat having a rudder member equipped with a control piece, comprising, in combination, a fixed base mounted on the sailing-boat, a mount pivotally supported in said base about a vertical axis, a cradle rotatably mounted on said mount about a horizontal axis, a wind vane rotatably mounted in said cradle about an axis perpendicular to said horizontal axis, means for adjusting the cradle tilt about said horizontal axis between two positions wherein the vane hinge axis is respectively substantially vertical and horizontal, and means for connecting the wind vane to the rudder member of the sailing-boat.

2. A sailing trim regulator for a sailing-boat having a rudder member equipped with a control piece, comprising, in combination, a fixed base mounted on the sailing-boat, a mount pivotally supported in said base about a vertical axis, a cradle rotatably mounted on said mount about a horizontal axis, a wind vane rotatably mounted in said cradle about an axis perpendicular to said horizontal axis, means for adjusting the cradle tilt about said horizontal axis between two positions wherein the vane hinge axis is respectively vertical and horizontal, means for locking said vane to said cradle while leaving the cradle free to pivot about said vertical axis, in such manner as to enable the regulator to operate as a weathercock, means for locking said cradle to said base and simultaneously freeing said vane in such manner as to enable the regulator to provide automatic steering of the sailing-boat, and means for connecting the wind vane to the rudder member of the sailing-boat.

3. A sailing trim regulator for sailing-boats according to claim 2, wherein the means for adjusting the cradle tilt about the horizontal axis consists of a conventional device for manually rotating said cradle about said horizontal axis, and means for retaining said device to the desired degree of cradle tilt.

4. A sailing trim regulator for sailing-boats according to claim 2, wherein the means for adjusting the cradle tilt about the horizontal axis comprises means connected to the cradle for returning it to the position wherein the vane hinge axis is horizontal, and wind force-sensitive means disposed at the free extremity of the vane for tilting the cradle into a position wherein said hinge axis is all the closer to the vertical as the wind is stronger.

5. A sailing trim regulator for sailing-boats according to claim 4, wherein the cradle return means consists of a spring connecting the cradle to a fixed point on the mount, said cradle being statically balanced about its hinge axis.

6. A sailing trim regulator for sailing-boats according to claim 4, wherein the cradle return means consists of a counterweight fixed to the cradle below its hinge axis and of weight such that the center of gravity of the assembly comprising the vane, the cradle and said counterweight is located below said axis.

7. A sailing trim regulator for sailing-boats according to claim 4, wherein said wind force-sensitive means consists of a projection disposed at the free end of the vane and offering resistance to the wind.

8. A sailing trim regulator for sailing-boats according to claim 2, wherein said vane is integral with two arms projecting on either side thereof and wherein the means for locking the vane to the cradle comprises two stops provided on the mount and with which said arms come into contact when the cradle is so tilted about its hinge axis that the vane hinge axis is close to the vertical.

9. A sailing trim regulator for sailing boats as claimed in claim 2, wherein said base is hollow and has an inner cylindrical wall, and wherein the means for locking the cradle comprises a cam of small thickness fixed beneath said cradle and provided in succession over an arcuate portion centered upon the cradle hinge axis with an area of small thickness joined by way of shoulders to an area of greater thickness, two jaws straddling said cam and coacting therewith along said arcuate portion, said jaws being pivotally connected to the mount adjacent the thick area of said cam and being mounted symmetrically with respect to a vertical plane through the vertical pivoting axis and having two opposed projections, and a return spring interconnecting said jaws to urge them into a position whereat the distance therebetween is slightly greater than the thickness of the thin area of said cam, the length of said jaws being such that when they are spread apart by penetration of the thick cam portion between their projections, their free ends jam against the inner cylindrical wall of the base.

10. A sailing trim regulator for sailing-boats according to claim 2, wherein the means for connecting the vane to the rudder member comprises a mechanical transmission means linked to said vane, and clutch means interconnecting said mechanical transmission means and the control piece of the rudder member.

11. A sailing trim regulator for sailing-boats according to claim 2, wherein the means for connecting the vane to the rudder member comprises a lever fixed to the foot of the vane and perpendicularly to said vane, a link attached to said lever, a cranked lever pivotally connected to said base and joined to said link through one of its extremities, a second link pivotally connected to the other extremity of said cranked lever, a sleeve journaled on the control piece of the rudder member, a lever rigidly united with said sleeve and connected to said second link, and a screw for rigidly uniting said sleeve with said control piece or for releasing it therefrom.

12. A sailing trim regulator for sailing-boats according to claim 2, wherein the means for connecting the vane to the rudder member consists of a hydraulic transmission comprising at least one control cylinder, a pressure-emitting piston movable within each control cylinder and connected to said vane, at least one receiving cylinder, a pressure-receiving piston movable within each receiving cylinder and connected to said rudder member, and pipe means connecting each control cylinder to a receiving cylinder.

13. A sailing trim regulator for sailing-boats according to claim 12, wherein each piston leaves a large peripheral clearance between it and the associated cylinder, a flexible diaphragm fixed to the cylinder and the piston being pinched therebetween within said clearance.

14. A sailing trim regulator for sailing-boats according to claim 12, wherein said hydraulic transmission comprises a lever fixed to the hinge axis perpendicularly to the vane, a control cylinder, a piston movable therein and connected to said lever, a second lever fixed perpendicularly to said rudder member on the control piece thereof, a receiving cylinder, a piston movable in said receiving cylinder and connected to said second lever, pipe means interconnecting these two cylinders, and two return springs respectively connecting said levers to anchoring points on the sailing-boat.

15. A sailing trim regulator for sailing-boats according to claim 12, wherein said hydraulic transmission comprises a beam-lever fixed centrally to the vane hinge shaft, two control cylinders, two pistons respectively movable therein and respectively connected to the two extremities of said beam-lever, a second beam-lever centrally affixed to the control piece of the rudder member, two receiving cylinders, two pistons respectively movable in said receiving cylinders and respectively connected to the two extremities of said second beam-lever, and two pipe means for cross-connecting said control cylinders to said receiving cylinders.

16. A sailing trim regulator for sailing-boats according to claim 12, wherein said hydraulic transmission comprises a beam-lever fixed centrally to the vane hinge shaft, two control cylinders, two pistons respectively movable therein and respectively connected to the two extremities of said beam-lever, a second beam-lever centrally affixed to the control piece of the rudder member, two receiving cylinders, two pistons respectively movable in said receiving cylinders and respectively connected to the two extremities of said second beam-lever, two pipe means for cross-connecting said control cylinders to said receiving cylinders, and a by-pass cock interposed between said pipe means.

17. A sailing trim regulator for sailing-boats according to claim 12, wherein said hydraulic transmission comprises a beam-lever fixed centrally to the vane hinge shaft, two control cylinders, two pistons respectively movable therein and respectively connected to the two extremities of said beam-lever, a second beam-lever centrally affixed to the control piece of the rudder member, two receiving cylinders, two pistons respectively movable in said receiving cylinders and respectively connected to the two extremities of said second beam-lever, two pipe means for cross-connecting said control cylinders to said receiving cylinders, two further control cylinders, two further pistons respectively movable in said further control cylinders, a third beam-lever centrally hinged upon the sailing-boat and having its extremities respectively connected to said two further pistons, a control lever fixed to said third beam-lever, and two further pipe means for connecting said further control cylinders to said pipe means.

18. A sailing trim regulator for sailing-boats according to claim 12, wherein said hydraulic transmission comprises a beam-lever fixed centrally to the vane hinge shaft, two control cylinders, two pistons respectively movable therein and respectively connected to the two extremities of said beam-lever, a second beam-lever centrally affixed to the control piece of the rudder member, two receiving cylinders, two pistons respectively movable in said receiving cylinders and respectively connected to the two extremities of said second beam-lever, two pipe means for cross-connecting said control cylinders to said receiving cylinders, two further control cylinders, two further pistons respectively movable in said further control cylinders, a third beam-lever centrally hinged upon the sailing-boat and having its extremities respectively connected to said two further pistons, a control lever fixed to said third beam-lever, two further pipe means for connecting said further control cylinders to said pipe means, and at least one hydraulic means connected to one of the pipes for generating a deflection lead of the rudder member relative to the movement of the vane when said deflection results from a rapid change in the position of the vane and the control lever.

19. A sailing trim regulator for sailing-boats according to claim 18, wherein each means for generating a deflection lead of the rudder member comprises an elastic capacity and a conduit connecting the same to one of the pipes and incorporating a constriction.

20. A sailing trim regulator for sailing-boats according to claim 2, wherein the means for connecting the vane to the rudder member comprises a mechanical transmission means connected to said vane, and a means for reducing the force normally required to operate said rudder member.

21. A sailing trim regulator for sailing-boats according to claim 20, wherein the rudder member comprises a conventional after-piece hinged onto the name-board of the sailing-boat, an auxiliary tab hinged to the rear of said after-piece, and a conventional tiller; and wherein the means for mechanical transmission and force-reducing comprise a lever fixed to the hinge shaft of the vane perpendicularly to the latter, a rod pivotally connected to said lever, a bearing which is fixed to the mount and pivots with the shaft thereof perpendicular at rest to said rod, a shaft journaled in said bearing and extending toward said after-piece, a first lever fixed to said shaft and pivotally connected to the other end of said rod, a second lever fixed to the free end of said shaft and directed substantially vertically in its resting position, a third lever fixed to said auxiliary tab and projecting therefrom away from said mount, a second rod interconnecting said second and third levers, a fourth lever embodying a slot and fixed to that face of said after-piece which is adjacent said mount, an arm fixed to said mount and extending toward said after-piece, and a peg fixed to said arm and engaging in said slot.

22. A sailing trim regulator for sailing-boats according to claim 2, wherein the means for connecting the vane to the rudder member comprises a mechanical transmission means connected to said vane, a means for reducing the force normally required to operate said rudder member, means for slaving said rudder member to the vane in the automatic steering position, and means for hydrodynamically locking said after-piece and said tiller.

23. A sailing trim regulator for sailing-boats according to claim 22, wherein the rudder member comprises a conventional after-piece hinged onto the name-board of the sailing-boat, an auxiliary tab hinged to the rear of said after-piece, and a conventional tiller; and wherein the means for mechanical transmission and force-reducing, for slaving said rudder member to the vane in the automatic steering position and for hydrodynamically locking said after-piece and said tiller comprise a lever fixed to the hinge shaft of the vane perpendicularly to the latter, a rod pivotally connected to said lever, a bearing which is fixed to the mount and pivots with the shaft thereof perpendicular at rest to said rod, a shaft journaled in said bearing and extending toward said after-piece, a first lever fixed to said shaft and pivotally connected to the other end of said rod, a second lever fixed to the free end of said shaft and directed substantially vertically in its resting position, a third lever fixed to said auxiliary tab and projecting therefrom away from said mount, a second rod interconnecting said second and third levers, a fourth lever embodying a slot and fixed to that face of said after-piece which is adjacent said mount, an arm fixed to said mount and extending toward said after-piece, a peg fixed to said arm and engaging in said slot, a horizontal shaft pivotally attached to said sailing-boat, an eccentric shoe carried by said horizontal shaft, aligned vertically with said arm and having upstanding flanges which are spaced from each other by a distance slightly greater than the width of said arm so as to engage the same and disengage said peg from said slot, and an operating lever fixed to said horizontal arm.

24. A sailing trim regulator for a sailing-boat having a rudder member equipped with a control piece, comprising, in combination, a fixed base mounted on the sailing-boat, a mount pivotally supported in said base about a vertical axis, a cradle rotatably mounted on said mount about a horizontal axis, a wind vane rotatably mounted in said cradle about an axis perpendicular to said horizontal axis, means for adjusting the cradle tilt about said horizontal axis between two positions wherein the vane hinge axis is respectively vertical and horizontal, means for locking said vane to said cradle while leaving the cradle free to pivot about said vertical axis in such manner as to enable the regulator to operate as a weathercock, means for locking said cradle to said base and simultaneously freeing said vane in such manner as to enable the regulator to provide automatic steering of the sailing-boat, means for connecting the wind vane to the rudder member of the sailing-boat, and means for generating a deflection lead of the rudder member relative to the movement of the vane when said deflection results from a rapid change in the position of the vane and the control lever.

25. A sailing trim regulator for a sailing-boat having a rudder member equipped with a control piece, comprising, in combination, a fixed base mounted on the sailing-boat, a mount pivotally supported in said base about a vertical axis, a cradle rotatably mounted on said mount about a horizontal axis, a wind vane rotatably mounted in said cradle about an axis perpendicular to said horizontal axis, means for adjusting the cradle tilt about said horizontal axis between two positions wherein the vane hinge axis is respectively vertical and horizontal, means for locking said vane to said cradle while leaving the cradle free to pivot about said vertical axis in such manner as to enable the regulator to operate as a weathercock, means for locking said cradle to said base and simultaneously freeing said vane in such manner as to enable the regulator to provide automatic steering of the sailing-boat, means for connecting the wind vane to the rudder member of the sailing-boat, comprising a mechanical transmission means connected to said vane and a means for reducing the force normally required to operate said rudder member, means for slaving said rudder member to the vane in the automatic steering position, and means for hydrodynamically locking said after-piece and said tiller.

References Cited by the Examiner
UNITED STATES PATENTS

| 1,661,115 | 2/28 | Flettner | 114—167 |
|---|---|---|---|
| 1,681,415 | 8/28 | Lee | 114—39 |
| 1,841,443 | 1/32 | Hohlt | 46—93 |
| 1,846,458 | 2/32 | Robinson | 114—39 |
| 2,112,171 | 3/38 | Marlow | 114—39 XR |
| 2,653,563 | 9/53 | Long | 114—39 |
| 2,996,031 | 8/61 | Easter | 114—167 |

OTHER REFERENCES

Popular Mechanics "Midget Yachts Race for Fun," vol. 2, No. 2, August 1953, pages 97–100.

FERGUS S. MIDDLETON, *Primary Examiner.*

MILTON BUCHLER, *Examiner.*